(12) United States Patent
Malur Srinivasan et al.

(10) Patent No.: US 10,699,161 B2
(45) Date of Patent: Jun. 30, 2020

(54) TUNABLE GENERATIVE ADVERSARIAL NETWORKS

(71) Applicant: FUJITSU LIMITED, Kawasaki-shi, Kanagawa (JP)

(72) Inventors: Ramya Malur Srinivasan, Sunnyvale, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 15/908,737

(22) Filed: Feb. 28, 2018

(65) Prior Publication Data
US 2019/0266442 A1    Aug. 29, 2019

(51) Int. Cl.
*G06K 9/62* (2006.01)

(52) U.S. Cl.
CPC ......... *G06K 9/6254* (2013.01); *G06K 9/6256* (2013.01); *G06K 9/6284* (2013.01)

(58) Field of Classification Search
CPC .. G06K 9/6254; G06K 9/6256; G06K 9/6284; G06K 9/6273; G06F 16/532; G06F 16/535; G06F 16/538; G06N 3/08; G06Q 30/0621
USPC ........................................................ 382/159
See application file for complete search history.

(56) References Cited

U.S. PATENT DOCUMENTS

| | | | | |
|---|---|---|---|---|
| 10,043,109 | B1* | 8/2018 | Du | G06N 3/0454 |
| 10,314,477 | B1* | 6/2019 | Goodsitt | H04N 1/6088 |
| 2019/0138847 | A1* | 5/2019 | Shor | G06K 9/6253 |
| 2019/0228495 | A1* | 7/2019 | Tremblay | G06N 3/08 |
| 2019/0251612 | A1* | 8/2019 | Fang | G06F 16/535 |
| 2019/0287301 | A1* | 9/2019 | Colbert | G06N 3/08 |

OTHER PUBLICATIONS

Tenenbaum, J. B., & Freeman, W. T. (1997). Separating style and content. In Advances in neural information processing systems (pp. 662-668).
Gatys, L. A., Ecker, A. S., & Bethge, M. (2015). A neural algorithm of artistic style. arXiv preprint arXiv:1508.06576.
Johnson, J., Alahi, A., & Fei-Fei, L. (Oct. 2016). Perceptual losses for real-time style transfer and super-resolution. In European Conference on Computer Vision (pp. 694-711). Springer, Cham.
Bengio, Y., Courville, A., & Vincent, P. (2013). Representation learning: A review and new perspectives. IEEE transactions on pattern analysis and machine intelligence, 35(8), 1798-1828.
(Continued)

*Primary Examiner* — Ali Bayat
(74) *Attorney, Agent, or Firm* — Maschoff Brennan

(57) ABSTRACT

A method of tuning a generative model may be provided. A method may include receiving, at a first generative adversarial network (GAN), a first input identifying an item and at least one user-defined attribute for the item. The method may also include generating, via the first GAN, a first image of the item based on the first input. Further, the method may include receiving, at a second GAN, the first image and a second input indicative of a desire for more or less of the at least one user-defined attribute. Moreover, the method may include generating, via the second GAN, a second image of the item based on the first image and the second input.

20 Claims, 6 Drawing Sheets

(56) References Cited

OTHER PUBLICATIONS

Bau, D., Zhou, B., Khosla, A., Oliva, k, & Torralba, A. (Jul. 2017). Network dissection: Quantifying interpretability of deep visual representations. In Computer Vision and Pattern Recognition (CVPR), 2017 IEEE Conference on (pp. 3319-3327). IEEE.
Reed, S., Akata, Z., Yan, X., Logeswaran, L., Schiele, B., & Lee, H. (2016). Generative adversarial text to image synthesis. arXiv preprint arXiv:1605.05396.
Gunning, D. (2017). Explainable artificial intelligence (xai). Defense Advanced Research Projects Agency (DARPA), nd Web.
Hendricks, L. A., Akata, Z., Rohrbach, M., Donahue, J., Schiele, B., & Darrell, T. (Oct. 2016). Generating visual explanations. In European Conference on Computer Vision (pp. 3-19). Springer, Cham.
Heckel, R., Vlachos, M., Parnell, T., & Dünner, C. (Apr. 2017). Scalable and interpretable product recommendations via overlapping co-clustering. In Data Engineering (ICDE), 2017 IEEE 33rd International Conference on (pp. 1033-1044). IEEE.
Ribeiro, M. T., Singh, S., & Guestrin, C. (Aug. 2016). Why should i trust you?: Explaining the predictions of any classifier. In Proceedings of the 22nd ACM SIGKDD International Conference on Knowledge Discovery and Data Mining (pp. 1135-1144). ACM.
Goodfellow, I., Pouget-Abadie, J., Mirza, M., Xu, B., Warde-Farley, D., Ozair, S., . . . & Bengio, Y. (2014). Generative adversarial nets. In Advances in neural information processing systems (pp. 2672-2680).
Denton, E. L., Chintala, S., & Fergus, R. (2015). Deep generative image models using a laplacian pyramid of adversarial networks. In Advances in neural information processing systems (pp. 1486-1494).
Radford, A., Metz, L., & Chintala, S. (2015). Unsupervised representation learning with deep convolutional generative adversarial networks. arXiv preprint arXiv:1511.06434.
Chen, X., Duan, Y., Houthooft, R., Schulman, J., Sutskever, I., & Abbeel, P. (2016). Infogan: Interpretable representation learning by information maximizing generative adversarial nets. In Advances in Neural Information Processing Systems (pp. 2172-2180).
Lopez-Paz, D., & Oquab, M. (2016). Revisiting classifier two-sample tests. arXiv preprint arXiv:1610.06545.
Srinivasan, R., Roy-Chowdhury, A., & Rudolph, C. (2015). Computerized Face Recognition in Renaissance Portrait Art.
Ferrari, V., & Zisserman, A. (2008). Learning visual attributes. In Advances in Neural Information Processing Systems (pp. 433-440).
Kumar, N., Berg, A. C., Belhumeur, P. N., & Nayar, S. K. (Sep. 2009). Attribute and simile classifiers for face verification. In Computer Vision, 2009 IEEE 12th International Conference on (pp. 365-372). IEEE.
Parikh, D., & Grauman, K. (Nov. 2011). Relative attributes. In Computer Vision (ICCV), 2011 IEEE International Conference on (pp. 503-510). IEEE.
Salimans, T., Goodfellow, I., Zaremba, W., Cheung, V., Radford, A., & Chen, X. (2016). Improved techniques for training gans. In Advances in Neural Information Processing Systems (pp. 2234-2242).
Yang, J., Kannan, A., Batra, D., & Parikh, D. (Mar. 2017). LR-GAN: Layered recursive generative adversarial networks for image generation. arXiv preprint arXiv:1703.01560.
Gurumurthy, S., Sarvadevabhatla, R. K., & Radhakrishnan, V. B. (Jun. 2017). Deligan: Generative adversarial networks for diverse and limited data. In the IEEE Conference on Computer Vision and Pattern Recognition (CVPR) (vol. 1).
Kümmerer, M., Wallis, T. S., & Bethge, M. (2016). DeepGaze II: Reading fixations from deep features trained on object recognition. arXiv preprint arXiv:1610.01563.
Souri, Y., Noury, E, & Adeli, E. (Nov. 2016). Deep relative attributes. In Asian Conference on Computer Vision (pp. 118-133). Springer, Charm.

* cited by examiner

TUNABLE GENERATIVE ADVERSARIAL NETWORKS

FIELD

The embodiments discussed herein relate to tunable generative adversarial networks.

BACKGROUND

A generative adversarial network (GAN), which includes a plurality of neural networks, is a class of machine learning algorithms that may be used in generating data.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method of tuning a generative adversarial network (GAN) model. The method may include receiving, at a first GAN, a first user input identifying an item and at least one user-defined attribute for the item. The method may also include generating, via the first GAN, a first image of the item based on the first user input. Further, the method may include receiving the first image and a second input indicative of a desire for more or less of the user-defined attribute for the item. Moreover, the method may include generating, via the second GAN, a second image of the item based on the first image and the second user input.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
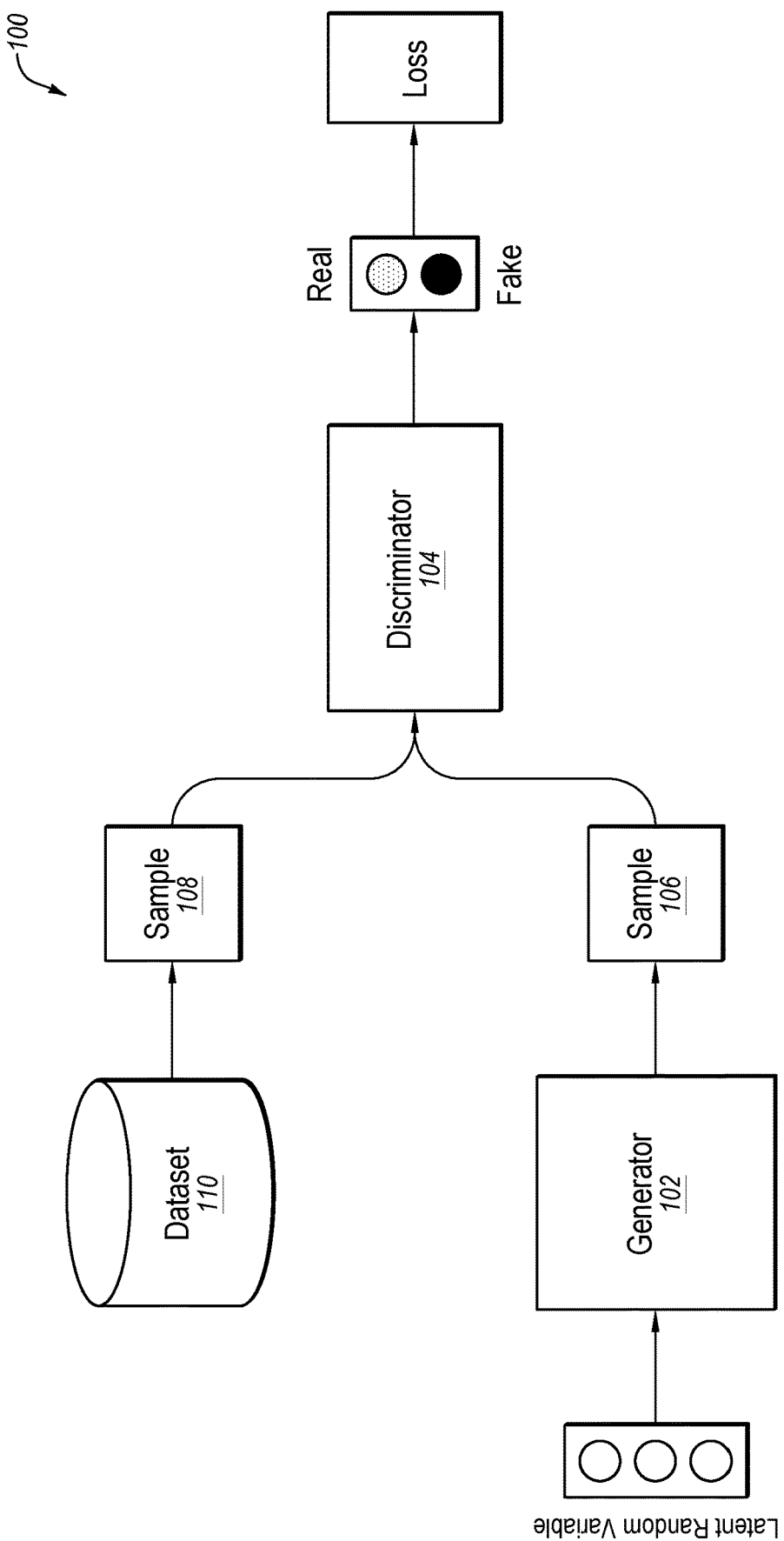
FIG. 1 depicts a generative adversarial network.

Various embodiments disclosed herein relate to tunable generative adversarial networks (GANs). For example, various embodiments may automatically generate images that are tunable by an end-user. In at least some embodiments, a tunable adversarial network includes a stacked GAN network, wherein a first GAN of the stacked GAN network may be configured to generate an image of an item with a visual attribute and a second GAN of the stacked GAN network may be configured to generate an image of the item with more or less of the visual attribute as specified by an end-user. Accordingly, various embodiments may enable the end-user to vary one or more visual attributes of an item in an image in a relative manner. Thus, accuracy of images generated via a GAN may be improved.

As used herein, an "attribute" or "visual attribute" may include semantic property and/or a visual quality of items. An attribute may include a representation in a higher level than the raw feature representation directly extracted from images or videos. For example, for a class of animals, one or more attributes may include, for example, "red," "striped," and/or "spotted." As another example, for a face (e.g., a human face), one or more attributes may include "mustache," "smiling," "bangs," "eyewear," "bushy eyebrows," "blonde hair," etc. As yet another example, for clothing (e.g., a dress), one or more attributes may include "blue," "shiny," "colorful," etc.

The term "generative model" may refer to any model that receives a training set, including samples drawn from a distribution, and learns to represent an estimate of the distribution. The result may be a probability distribution. Generative models may be used for simulation of new input-output signals, such as in the context of reinforcement learning, for simulation of possible futures. Generative models may be trained with missing input and may provide one or more prediction for inputs that are missing (e.g., semi-supervised learning).

GANs are an example of generative models. Generative models, which may include unsupervised representational learning models, may include a neural network that may "generate" artificial data much similar to real world data. To generate reliable data, a generative model should have a good understanding of the data structure and hence generative models may be used as efficient feature extraction techniques, in addition to generating data.

For example, a GAN may function as a game between two players, a generator and a discriminator. The generator may create samples that are intended to come from the same distribution as training data. The discriminator may examine samples to determine whether the samples are real or fake. The discriminator may learn using traditional supervised learning techniques, dividing inputs into two classes (e.g., real or fake). The generator is trained to fool the discriminator. The game may conclude when the generator generates data that becomes indistinguishable from the real data.

In contrast to conventional GANs, which are not end-user tunable, various embodiment disclosed herein may be configured to vary one or more visual attributes based on input from an end-user. Stated another, various embodiments may include a GAN configured to receive end-user input, and generate one or more images with more or less of one or more visual attributes, as specified by a user. Conventional GANs may suffer from poor accuracy and do not enable users to provide input for modifying images.

Thus, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Embodiments of the present disclosure are now explained with reference to the accompanying drawings.

FIG. 1 depicts an example generative adversarial network 100 including a generator 102 and a discriminator 104. Generator 102 is configured to generate data samples 106, and discriminator 104 is configured to receive data samples 106. Discriminator is further configured to receive training data sample 108 from a real image training dataset 110 including real world images. Discriminator 104 evaluates received data (e.g., generated images from generator 102 and real images from dataset 110) and determines whether the received data (e.g., each received image) is authentic (e.g., a real image from training dataset 110) or a fake image (e.g. an image from generator 102). Generative adversarial network 100 may include one or more feedback loops wherein generator 102 and/or discriminator 104 may be trained via an output of discriminator 104.

Figure 2:
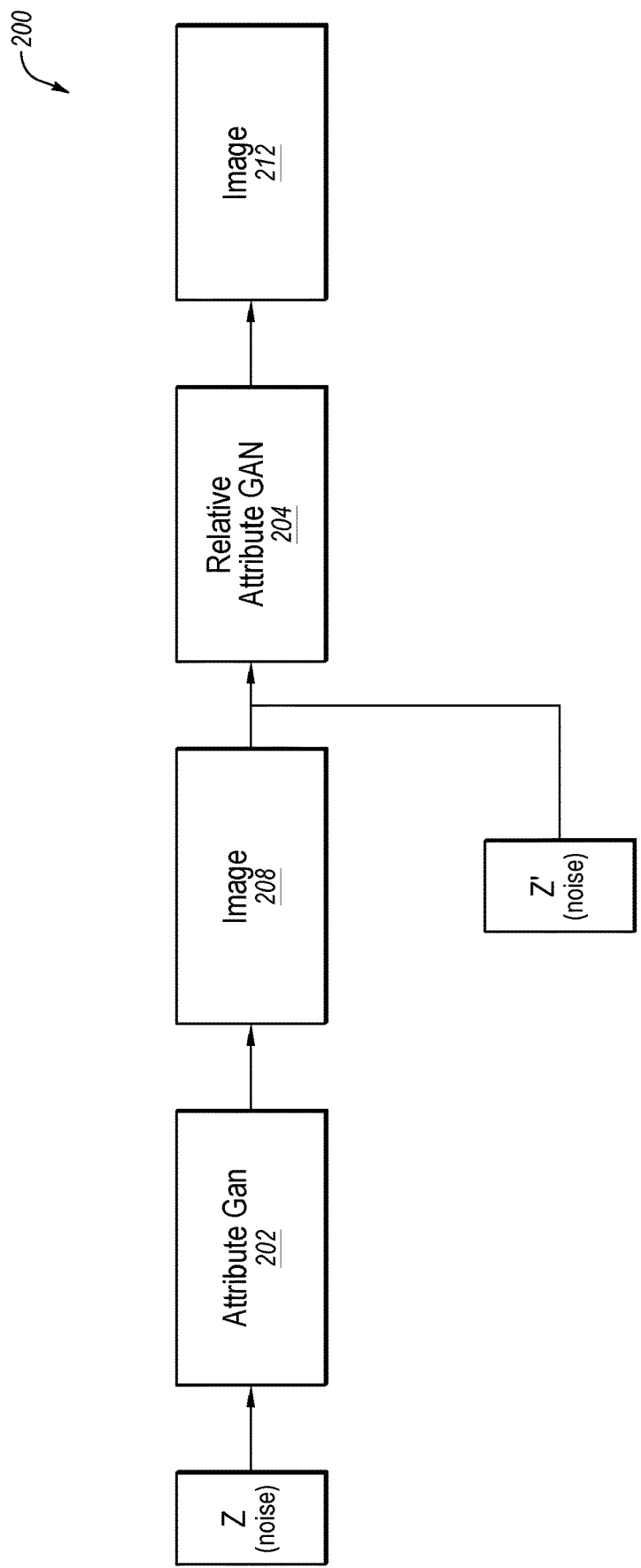
FIG. 2 illustrates a tunable generative model including an attribute generative adversarial network and a relative attribute generative adversarial network.
Figure 3:
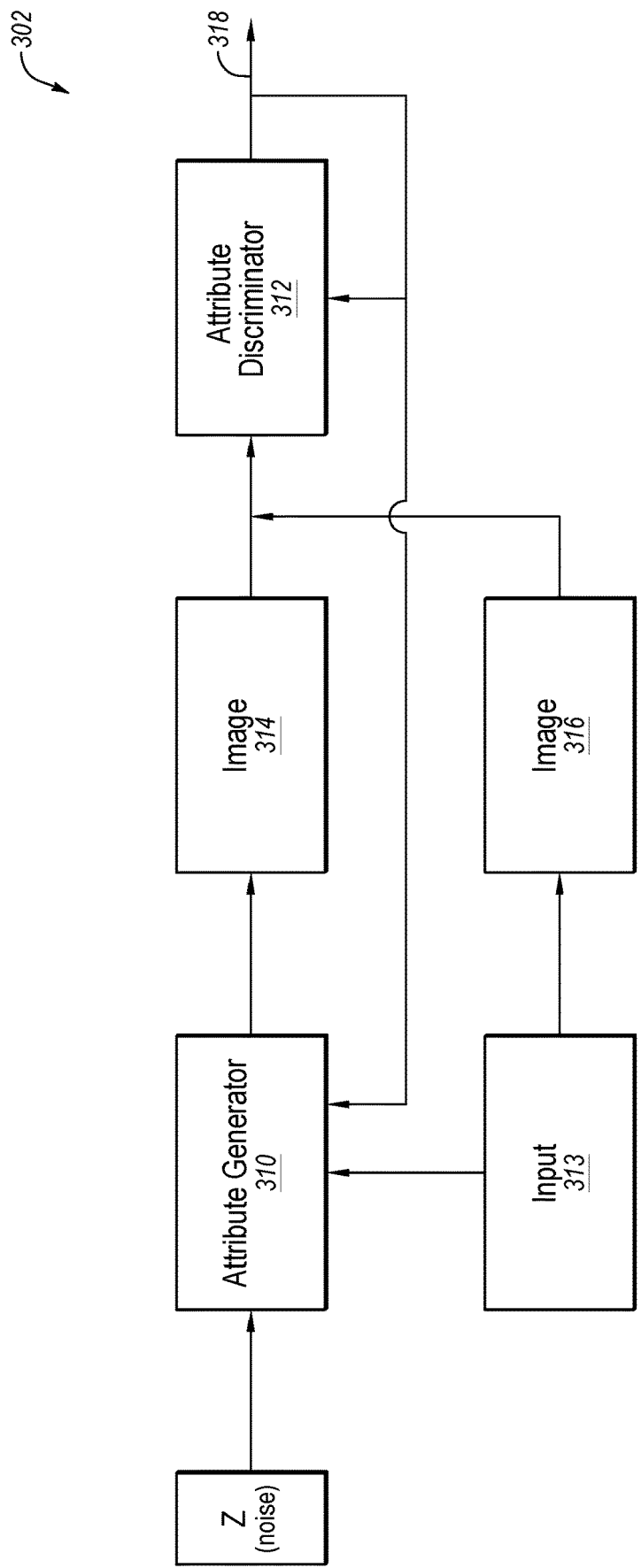
FIG. 3 depicts an example attribute generative adversarial network.

FIG. 2 illustrates an example tunable generative model 200, arranged in accordance with at least one embodiment of the present disclosure. Generative model 200 includes an attribute GAN 202 and relative attribute GAN 204 (e.g., in a stacked configuration). Attribute GAN 202 is configured to received noise Z and generate image 208, which may include, for example, an image with a user-defined attribute (also referred to herein as a "user-specified attribute"). More specifically, based on input from a user (e.g., identifying an item and possibly one or more attributes), attribute GAN 202 may generate an image of the item, which may include one or more user-defined attributes. Further, relative attribute GAN 204 is configured to receive noise Z' and image 208. Relative attribute GAN 204 is further configured to generate image 212, which may include, for example, an image of the item with more or less of the user-defined attribute, as specified by the user. FIG. 3 depicts an example attribute GAN 302, arranged in accordance with at least one embodiment of the present disclosure. For example, attribute GAN 202 of FIG. 2 may include attribute GAN 302. Attribute GAN 302 includes an attribute generator 310 and an attribute discriminator 312. Relative attribute generator 310 is configured to receive noise Z and user input 313.

For example, user input 313 may include text, images, or both. More specifically, for example, user input 313 may include a text description (e.g., received from a user) describing an item and possibly one or more attributes for the item. More specifically, for example, user input 313 may include a text description reciting "a bird that is red and brown in color and has a stubby beak." As another example, user input 313 may include a text description reciting "a smiling, white male with brown curly hair, bushy eyebrows, shiny skin, and a mustache." As yet another example, user input 313 may include a text description reciting "a black shiny dress with white circles."

Further, in response to user input 313, attribute generator 310 is configured to generate image 314, which may include, for example, an image of an item with one or more user-defined attributes (e.g., person with a smile, a person with blonde hair, a red dress, a bird with a large beak, a dog with small ears, a person with a shiny forehead, etc.), as specified in user input 313.

Further, attribute discriminator 312 is configured to receive image 314 and a real image 316 (e.g., a person smiling, a bird with red feathers, a person with curly blonde hair, a dog, etc.). For example, if image 314 is an image of a smiling person, real image 316 may be a person with a smile. As another example, if image 314 is an image of a red dress, real image 316 may be an image of a red dress. As an example, image 316 may be received from a real image training dataset (e.g., training dataset 110 of FIG. 1)

Attribute discriminator 312 is further configured to generate a signal 318, which may be indicative of whether or not the one or more user-defined attributes are present in image 314. For example, signal 318 may include a binary classification indicative of either the presence or the absence of the one or more user-defined attributes in image 314.

As illustrated, GAN 302 may further include one or more feedback loops coupling signal 318 to attribute generator 310 and/or attribute discriminator 312. Accordingly, GAN 302 (e.g., attribute generator 310 and/or attribute discriminator 312) may be trained via an output of attribute discriminator 312. Training of GAN 302 may be based on one or more known machine learning techniques (e.g., known machine learning algorithms and/or known machine learning models) applied to signal 318. For example, deep learning models, such as stochastic gradient descent, Adam optimizer, or any other suitable technique may be used to train GAN 302.

Figure 4:
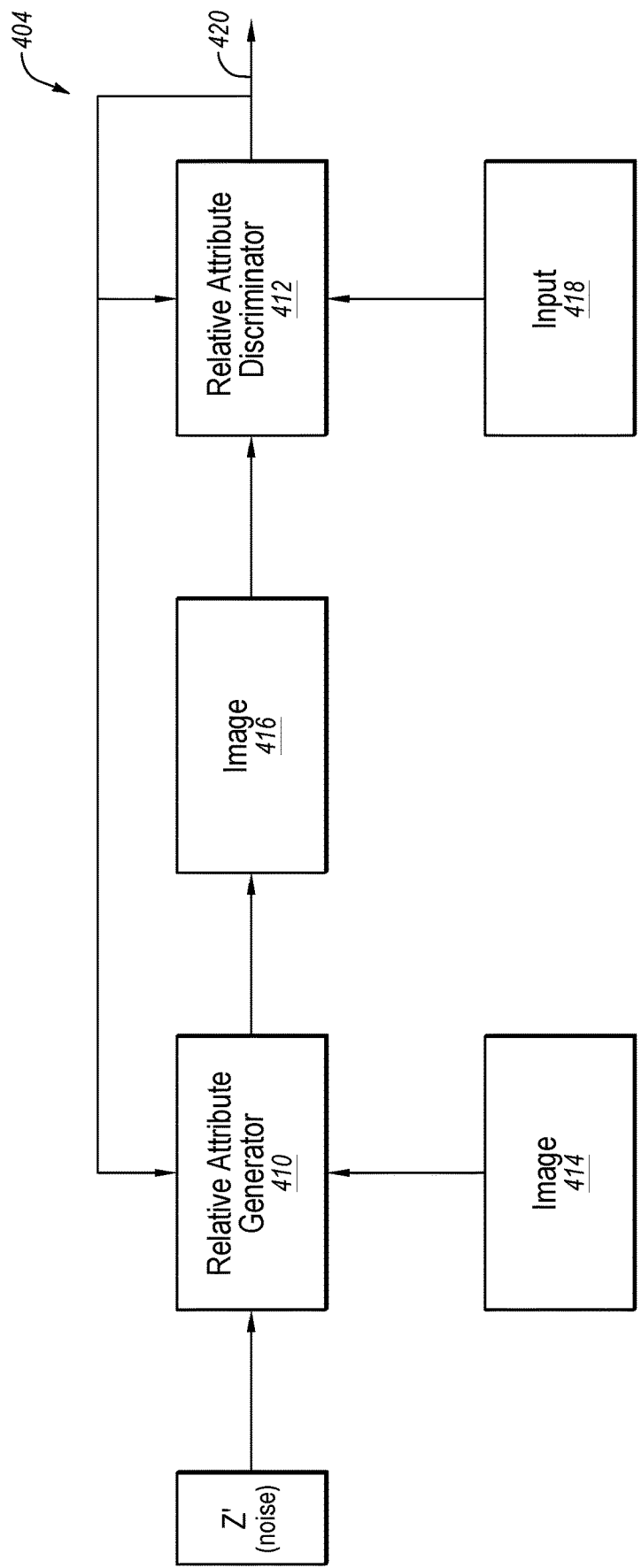
FIG. 4 illustrates an example relative attribute generative adversarial network.

FIG. 4 depicts an example relative attribute GAN 404, arranged in accordance with at least one embodiment of the present disclosure. For example, attribute GAN 204 of FIG. 2 may include attribute GAN 404. Attribute GAN 404 includes a relative attribute generator 410 and a relative attribute discriminator 412. Relative attribute generator 410 is configured to receive noise Z' and image 414, which may include, for example, an attribute image generated via GAN 302 (e.g., image 314 of FIG. 3).

Relative attribute generator 410 is further configured to generate image 416, which may include, for example, an image with one or more user-defined attributes. Further, relative attribute discriminator 412 is configured to receive image 416 and user input 418, which may include, for example, an image with more or less of the one or more user-defined attributes. For example, user input 418 may include, for example, text and/or an image and may identify a whether a degree of each attributes of the one or more user-defined attributes should be increased or decreased. More specifically, for example, in comparison to image 416, user input 418 may include an image with a person with a bigger smile, a dress with less color, a person with curlier hair, a bird with a bigger beak, etc.

In one example operation wherein a user desires dresses that are more red in color, the user may select (e.g., from an image repository) and provide to discriminator 412 images that are more red in color. Discriminator 412 may be configured to distinguish the characteristics of real images (e.g., dresses that are more red in color) and fake images (e.g., dresses that are not more red in color).

Attribute discriminator 412 is further configured to generate a signal 420, which may be indicative of whether or not the one or more user-defined attributes are present in image 416. For example, signal 420 may include a binary classification indicative of either the presence of the one or more user-defined attributes or the absence of the one or more user-defined attributes.

Further, GAN 404 may include one or more feedback loops coupling signal 420 to relative attribute generator 410 and/or relative attribute discriminator 412. Accordingly, GAN 402 (e.g., relative attribute generator 410 and/or relative attribute discriminator 412) may be trained via an output of relative attribute discriminator 412. In at least some embodiments, relative attribute generator 410 and/or relative attribute discriminator 412 may be trained based on user input 418 and/or signal 420. More specifically, for example, based on an image of user input 418, generator 410 may be configured to modify a generated image (e.g., image 416).

Training of GAN 404 may be based on one or more known machine learning techniques (e.g., known machine learning algorithms and/or known machine learning models) applied to output 420 and/or user input 418. More specifically, for example, training of one or more parameters of GAN 404 may be based on one or more deep learning models, such as stochastic gradient descent, Adam optimizer, or any other suitable technique may be used to train GAN 402.

Various, non-limiting mathematical functions for GAN 302 and GAN 404 will now be described. For example, given a set of training data set X1, X2, . . . XM, and random noise vectors z/z', the corresponding loss function for discriminator 312 in attribute GAN 302 may be as follows:

$$L_D(x,z) = \Sigma_{i=1 \, to \, M/2} L(D(Xi),1) + \Sigma_{M/2+1 \, to \, M} L(D(G(zi)), 0);$$

wherein, for example, approximately half of the images have a user-defined attribute and other half do not include the user-defined attribute.

The corresponding loss function for generator 310 in attribute GAN 302 may be as follows:

$$L_G(z) = \Sigma_{i=M/2+1 \, to \, M} L(D(G(zi)),1).$$

The corresponding loss function for discriminator 412 in relative attribute GAN 402 may be as follows:

$$L_D(x,C,z') = \Sigma_{i=1 \, to \, M/2} L(D(Ci,Xi),1) + \Sigma_{i=M/2+1 \, to \, M} L(D(Ci,G(Ci,z'i)),0).$$

Further, the corresponding loss function for generator 410 in relative attribute GAN 412 may be as follows:

$$L_G(C,z') = \Sigma_{i=M/2+1 \, to \, M} L(D(Ci,G(Ci,z'i)),1).$$

These mathematical functions are provided in a general manner (e.g., for a GAN and conditional GAN, respectively, for the two GANs in the stacked architecture, such as GAN 200).

Figure 5:
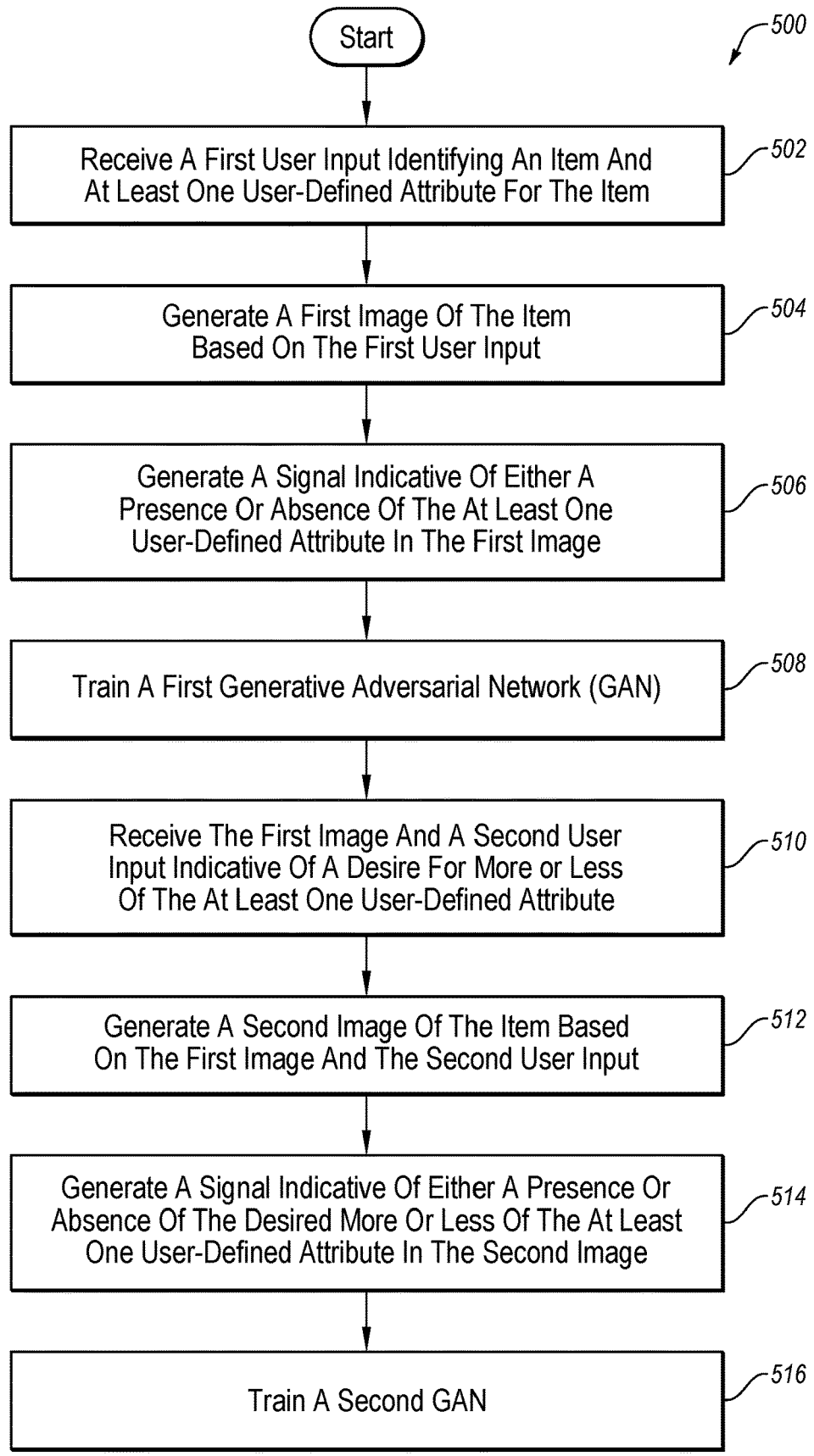
FIG. 5 is a flowchart of an example method of tuning a generative model.

FIG. 5 is a flowchart of an example method 500 of tuning a generative model including a plurality of GANs, in accordance with at least one embodiment of the present disclosure. Method 500 may be performed by any suitable system, apparatus, or device. For example, device 600 of FIG. 6 or one or more of the components thereof may perform one or more of the operations associated with method 500. In these and other embodiments, program instructions stored on a computer readable medium may be executed to perform one or more of the operations of method 500.

At block 502, a first input, identifying an item and at least one user-defined attribute for the item, may be received, and method 500 may proceed to block 504. For example, the first input may be received at a first GAN, such as attribute GAN 302 of FIG. 3. Further, for example, the first input may include text description (e.g., received from a user) describing the item and the at least one user-defined attribute. More specifically, for example, the text description may recite "a bird that is red and brown in color and has a stubby beak." As another example, a text description may recite "a white male with a smile, brown curly hair, bushy eyebrows, and a mustache." As yet another example, a text description may recite "a black shiny dress with white circles."

At block 504, a first image of the item may be generated based on the first input, and method 500 may proceed to block 506. For example, the first image may be generated via the first GAN (e.g., attribute GAN 302 of FIG. 3). In at least some embodiments, a plurality of images may be generated based on the first input, and one of the plurality of images (e.g., the best image) may be selected as the first image.

At block 506, a signal indicative of either the presence or the absence of the at least one user-defined attribute in the first image may be generated, and method 500 may proceed to block 508. More specifically, for example, the signal may include a binary classification indicative of either the presence or absence of the at least one user-defined attribute in the first image of the item. For example, the signal may be generated via the first GAN (e.g., attribute GAN 302 of FIG. 3). More specifically, the signal may be generated via attribute discriminator 312 of FIG. 3.

At block 508, a first GAN may be trained, and method 500 may proceed to block 510. For example a generator and/or a discriminator of the first GAN may be trained based on the signal that indicative of either the presence or the absence of the at least one user-defined attribute in the first image. More specifically, for example, attribute generator 310 and/or attribute discriminator 312 (see FIG. 3) may be trained based on the signal indicative of either the presence or the absence of the at least one user-defined attribute in the first image.

At block 510, the first image and a second input, which is indicative of a desire for more or less of the at least one user-defined attribute, may be received, and method 500 may proceed to block 512. For example, the first input and the second input may be received at a second GAN, such as relative attribute GAN 404 of FIG. 4. In at least some embodiments, the second input may include one or more real images including more or less of the at least one user-defined attribute. More specifically, for example, the one or more real images may include an image of a white male with a bigger smile (e.g., compared to a smile in the first image). As another example, the one or more real images may include an image of bird that is more yellow (e.g., compared to a bird in the first image).

At block 512, a second image of the item may be generated based on the first image and the second input, and method 500 may proceed to block 514. For example, the second image of the item may be generated via the second GAN (e.g., relative attribute GAN 404 of FIG. 4).

At block 514, a signal indicative of either the presence or the absence of the desired more or less of the at least one user-defined attribute in the second image may be generated, and method 500 may proceed to block 516. More specifically, for example, the signal may include a binary classification indicative of either the presence or absence of the desired more or less of the at least one user-defined attribute in the second image. For example, the signal may be generated via the second GAN (e.g., relative attribute GAN 404 of FIG. 4). More specifically, the signal may be generated via relative attribute discriminator 412 of FIG. 4.

At block 516, a second GAN may be trained. For example, a generator and/or a discriminator of the second GAN may be trained. More specifically, for example, relative attribute generator 410 and/or relative attribute discriminator 412 (see FIG. 4) may be trained based on the signal that is indicative of either the presence or the absence of the desired more or less of the user-defined attribute in the second image (e.g., image 416 of FIG. 4) and/or the second input (e.g., user input 418 of FIG. 4).

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

With reference to FIGS. 2-4, a non-limiting example operation of generative model 200 (see FIG. 2) will now be described. In this example, attribute GAN 202 includes attribute GAN 302 (see FIG. 3) and relative attribute GAN 204 includes relative attribute GAN 404 (see FIG. 4). User input 313, which may include a text description of an item and one or more attributes for the item, may be received at attribute generator 310. In this example, the text description recites "a black, shiny dress with white dots." Further, attribute generator 310 may generate image 314 of the item and including the one or more attributes, as specified by the user (e.g., a black, shiny dress with white dots).

Continuing with this example, attribute discriminator 312 may receive image 314 and image 316, which includes a real image of a black, shiny dress with white dots. Attribute discriminator 312 may generate signal 318, which may fed back to attribute generator 310 and/or attribute discriminator 312. Signal 318, which may be indicative of either the presence or the absence of the at least one user-defined attribute (e.g., black, shiny, and/or white dots), may be used to train attribute generator 310 and/or attribute discriminator 312.

Further, image 414, which may include image 314, may be conveyed to relative attribute generator 410. Relative attribute generator 410 may generate image 416, which may include an image of a black, shiny dress with white dots. Further, relative attribute discriminator 412 may receive image 416 and an input 418, which may include an image including more or less of one the at least one attribute. For example, input 418 may include an image of a black dress with white dots and having increased shininess compared to the dress of image 416.

Attribute discriminator 412 may generate signal 420, which may fed back to attribute generator 410 and/or attribute discriminator 412. Signal 420, which may be indicative of either the presence or the absence of the at least one user-defined attribute (e.g., shininess of the dress), may be used to train attribute generator 410 and/or attribute discriminator 412. In a subsequent operation, relative attribute generator 410 may generate image 416, which may include an image of a black dress with white dots, and the dress may be shinier than a dress in a previous image generated via relative attribute generator 410. This process may be repeated (e.g., until a user is satisfied with a generated image).

Accordingly, various embodiments described herein relate to end-user tunable GANs. Various embodiments of the present disclosure may be used in numerous applications, such as in education (e.g., sports coaching, teaching children painting styles, etc.), architecture (e.g., allowing the architect/future resident to modify or propose different design structures), fashion (e.g., enable a clothing store owner choosing different styles), advertising, sports coaching, art (e.g., painting), recipe creation, poetry creation, etc. Various embodiments may be useful to end-users who do not necessarily possess domain expertise (e.g., a clothing store owner who is not adept at designing clothing styles).

Figure 6:
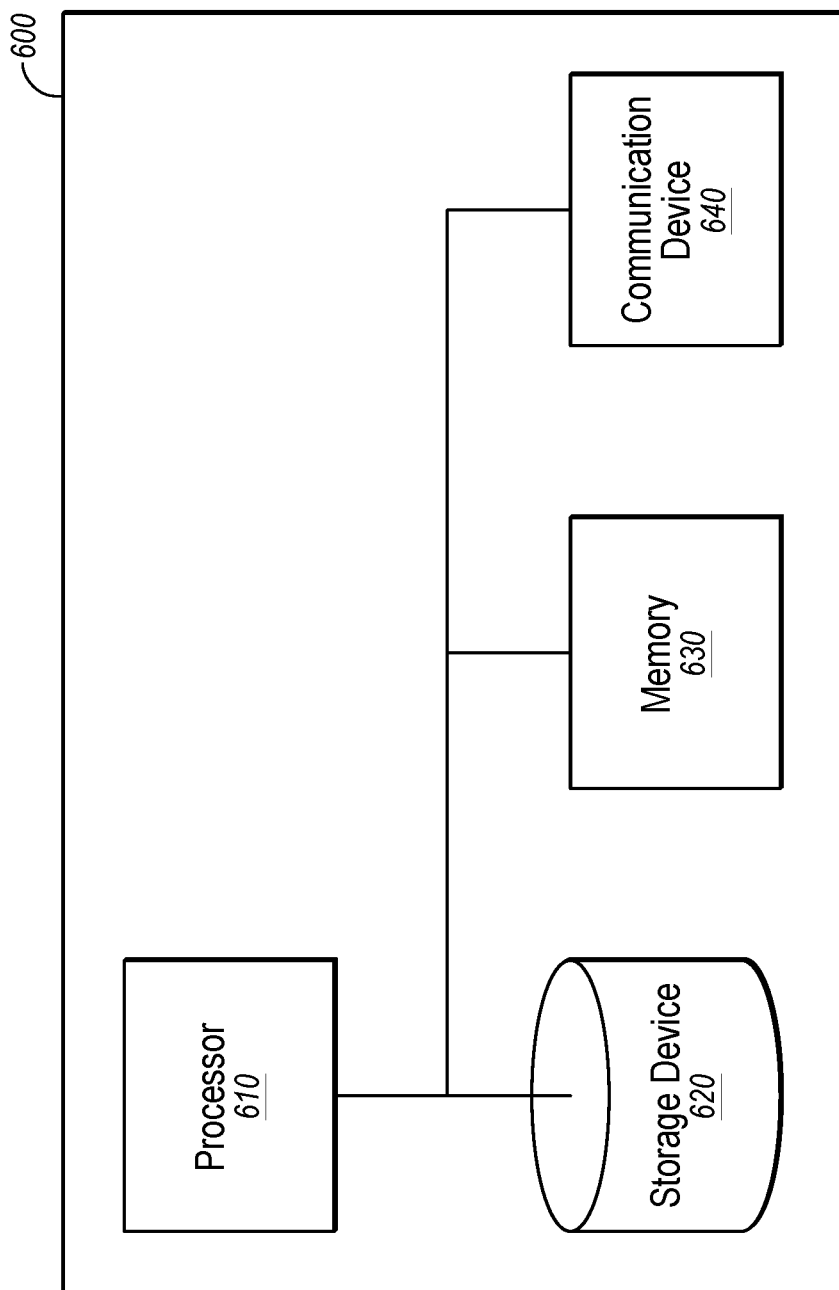
FIG. 6 is a block diagram of an example computing device that may be used in carrying out various embodiments of the present disclosure.

FIG. 6 is a block diagram of an example computing device 600, in accordance with at least one embodiment of the present disclosure. Computing device 600 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 600 may include a processor 610, a storage device 620, a memory 630, and a communication device 640. Processor 610, storage device 620, memory 630, and/or communication device 640 may all be communicatively coupled such that each of the components may communicate with the other components. Computing device 600 may perform any of the operations described in the present disclosure.

In general, processor 610 may include any suitable special-purpose or general-purpose computer, computing entity, or processing device including various computer hardware or software modules and may be configured to execute instructions stored on any applicable computer-readable storage media. For example, processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, processor 610 may include any number of processors configured to perform, individually or collectively, any number of operations described in the present disclosure.

In some embodiments, processor 610 may interpret and/or execute program instructions and/or process data stored in storage device 620, memory 630, or storage device 620 and memory 630. In some embodiments, processor 610 may fetch program instructions from storage device 620 and load the program instructions in memory 630. After the program instructions are loaded into memory 630, processor 610 may execute the program instructions.

For example, in some embodiments one or more of processing operations for tuning a GAN may be included in data storage 620 as program instructions. Processor 610 may fetch the program instructions of one or more of the processing operations and may load the program instructions of the processing operations in memory 630. After the program instructions of the processing operations are loaded into memory 630, processor 610 may execute the program instructions such that computing device 600 may implement the operations associated with the processing operations as directed by the program instructions.

Storage device 620 and memory 630 may include computer-readable storage media for carrying or having computer-executable instructions or data structures stored thereon. Such computer-readable storage media may include any available media that may be accessed by a general-purpose or special-purpose computer, such as processor 610. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

In some embodiments, storage device 620 and/or memory 630 may store data associated with tuning GANs, and more specifically, data associated with image generation and/or training one or more elements of one or more GANs. For example, storage device 620 and/or memory 630 may user inputs, generated images, real images, and/or outputs.

Communication device 640 may include any device, system, component, or collection of components configured to allow or facilitate communication between computing device 600 and another electronic device. For example, communication device 640 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 640 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 6 without departing from the scope of the present disclosure. For example, computing device 600 may include more or fewer elements than those illustrated and described in the present disclosure. For example, computing device 600 may include an integrated display device such as a screen of a tablet or mobile phone or may include an external monitor, a projector, a television, or other suitable display device that may be separate from and communicatively coupled to computing device 600.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of tuning generative adversarial networks, the method comprising:
   receiving, at a first generative adversarial network (GAN), a first input of a user identifying an item and at least one user-defined attribute for the item;
   generating, via the first GAN, a first image of the item based on the first input;
   receiving, at a second GAN, the first image and a second input of the user, the second input including an indication of an adjustment to the at least one user-defined attribute for the item; and
   generating, via the second GAN, a second image of the item based on the first image and the second input.

2. The method of claim 1, wherein receiving the first input comprises receiving text as the first input.

3. The method of claim 1, wherein receiving the second input comprises receiving a third image as the second input.

4. The method of claim 3, wherein receiving the third image comprises receiving a real image.

5. The method of claim 1, further comprising generating, via the first GAN, a binary classification indicative of either a presence or absence of the at least one user-defined attribute in the first image.

6. The method of claim 1, further comprising generating, via the second GAN, a binary classification indicative of either a presence or absence of the adjustment to the at least one user-defined attribute in the second image.

7. The method of claim 1, further comprising training at least one of a generator and a discriminator of the second GAN based on the second input.

8. A system, including:
a first generative adversarial network (GAN) configured to:
  receive a first input of a user identifying an item and at least one user-defined attribute for the item; and
  generate a first image of the item based on the first input; and
a second GAN coupled to the first GAN and configured to:
  receive the first image;
  receive a second input of the user that includes an indication of an adjustment to the at least one user-defined attribute for the item; and
  generate a second image of the item based on the first image and the second input.

9. The system of claim 8, wherein the second input includes a real image including more or less of the user-defined attribute.

10. The system of claim 8, wherein the first input includes a text input.

11. The system of claim 8, wherein the first GAN is further configured to generate a binary classification indicative of either a presence or absence of the user-defined attribute in the first image.

12. The system of claim 8, wherein the second GAN is further configured to generate a binary classification indicative of either a presence or absence of the adjustment to the user-defined attribute in the second image.

13. The system of claim 8, wherein at least one of a generator and a discriminator of the second GAN is configured to be trained based on the second input.

14. One or more non-transitory computer-readable media that include instructions that, when executed by one or more processors, are configured to cause a system to perform operations, the operations comprising:
  receiving a first input of a user identifying an item and at least one user-defined attribute for the item;
  generating a first image of the item based on the first input;
  receiving the first image and a second input of the user that includes an indication of an adjustment to the at least one user-defined attribute for the item; and
  generating a second image of the item based on the first image and the second input.

15. The computer-readable media of claim 14, wherein receiving the first input comprises receiving text as the first input.

16. The computer-readable media of claim 14, wherein receiving the second input comprises receiving a third image as the second input.

17. The computer-readable media of claim 16, wherein receiving the third image comprises receiving a real image.

18. The computer-readable media of claim 14, the operations further comprising generating a binary classification indicative of either a presence or absence of the user-defined attribute in the first image.

19. The computer-readable media of claim 14, the operations further comprising generating a binary classification indicative of either a presence or absence of the adjustment to the user-defined attribute in the second image.

20. The computer-readable media of claim 14, the operations further comprising training at least one of a generator and a discriminator of a generative adversarial network (GAN) based on the second input.

* * * * *